United States Patent [19]
Fifield et al.

[11] Patent Number: 5,638,385
[45] Date of Patent: Jun. 10, 1997

[54] FAST CHECK BIT WRITE FOR A SEMICONDUCTOR MEMORY

[75] Inventors: John A. Fifield, Underhill; Duane E. Galbi, Jerico; Hsing-San Lee, Essex Junction, all of Vt.

[73] Assignee: International Business Machines Corporation, Armonk, N.Y.

[21] Appl. No.: 785,625

[22] Filed: Oct. 31, 1991

Related U.S. Application Data

[63] Continuation-in-part of Ser. No. 517,896, Apr. 16, 1990, Pat. No. 5,307,356.
[51] Int. Cl.$^6$ .................................................. G11C 29/00
[52] U.S. Cl. ............................... 371/40.1; 371/40.4
[58] Field of Search ............................ 371/40.1, 40.2, 371/40.4; 364/245.5, 243.4, 964.2, 967; 365/225.7, 182, 185, 189.05, 189, 154, 156, 190

[56] References Cited

U.S. PATENT DOCUMENTS

| | | | |
|---|---|---|---|
| 4,333,168 | 6/1982 | Mashiko et al. | 365/210 |
| 4,335,459 | 6/1982 | Miller | 371/38 |
| 4,833,648 | 5/1989 | Scharrer et al. | 365/189.05 |
| 4,862,462 | 8/1989 | Zulian | 371/38 |
| 4,985,644 | 1/1991 | Okihara et al. | 307/443 |
| 5,285,323 | 2/1994 | Hetherington et al. | 364/252 |

FOREIGN PATENT DOCUMENTS

| | | |
|---|---|---|
| 0294947 | 5/1988 | European Pat. Off. |
| 57-143800 | 9/1982 | Japan |
| 1208799 | 8/1989 | Japan |
| 1-208799 | 8/1989 | Japan |

OTHER PUBLICATIONS

Morris, D, "ECC Chip Reduces Error Rate in Dynamic Rams", *Computer Design*, vol. 19, 19 0, pp. 137–142.

"Selector–Line Merged Built–In ECC Technique for DRAM's" IEEE Journal of Solid–State Circuits, Oct., 1987 vol. SC.-22.

"Circuit Technologies for 16Mb DRAMs", Feb. 25, 1987 1987 IEEE International Solid State Circuits Conference.

"A Built–In Hamming Code ECC Circuit for DRAM's", Feb., 1989 IEEE Journal of Solid–State Circuits, vol. 24, No. 1.

"An Experimental 1Mb Cache Dram with ECC", Author: Asakura, et al.

"A Speed Enhancement Dram Array Architecture with Embedded ECC", Author: Arimoto, et al.

*Primary Examiner*—Robert W. Beausoliel, Jr.
*Assistant Examiner*—Trinh L. Tu
*Attorney, Agent, or Firm*—Heslin & Rothenberg, P.C.

[57] ABSTRACT

A memory device having an on-chip ECC system includes an array of memory cells, some of which have wider transistors than others so that they have faster access speeds. Data bits are written into ordinary memory cells and the check bits are written into the faster cells in order to make up for the delay associated with the calculation of the check bits.

2 Claims, 15 Drawing Sheets

FAST CHECK BIT WRITE FOR A SEMICONDUCTOR MEMORY

CROSS-REFERENCE TO RELATED APPLICATIONS

This application is a continuation-in-part of commonly assigned, U.S. patent application Ser. No. 07/517,896, filed Apr. 16, 1990 by J. A. Fifield entitled, "Interlocked On-Chip ECC System" now U.S. Pat. No. 5,307,356 issued Apr. 26, 1994.

Reference is made to commonly-assigned, U.S. Pat. No. 5,134,616, filed Feb. 13, 1990 by J. E. Barth et al, entitled "Dynamic RAM With On-Chip ECC and Optimized Bit and Word Redundancy," the teachings of which are incorporated herein by reference. Barth et al. relates to an on-chip ECC system for DRAMs, wherein the configuration of the on-chip bit line and word line redundancy has been optimized to support on-chip ECC.

BACKGROUND OF THE INVENTION

1. Technical Field

The present invention relates in general to on-chip ECC systems for DRAMs, and more specifically to an interlocked on-chip ECC system that minimizes access delays imposed by the ECC system.

2. Background Art

From the very early stages of DRAM development in the 1970's, designers have recognized the need for some sort of on-chip error recovery circuitry. That is, given the large number of processing steps needed to make a memory chip, and given the large number of discrete transistor-capacitor memory cells to be fabricated, from a practical standpoint it is inevitable that at least some memory cells will not function properly. In the past, this problem was addressed by including spare (or "redundant") rows and/or columns of memory cells, and switching the redundant rows/columns for any rows/columns of the memory array that are faulty.

However, it has become clear that redundancy in and of itself cannot efficiently rectify all of the possible errors that may occur during DRAM operation. Specifically, a memory cell that initially operates properly may operate improperly once it is in use in the field. This may be either a so-called "soft error" (e.g. a loss of stored charge due to an alpha particle radiated by the materials within which the memory chip is packaged) or a "hard error" (a cycle-induced failure in the metallization or other material in the chip that occurs after prolonged use in the field). Because both of these types of errors occur after initial testing, they cannot be corrected by redundancy. Moreover, as the number of rows/columns of cells in the memory increases, the relative fault coverage afforded by each redundant line decreases. These problems have been addressed by the use of error correction codes (ECC) such as Hamming codes or horizontal-vertical (H-V) parity. For a general overview of Hamming codes, see C. Chen et al, "Error Correcting Codes For Semiconductor Memory Applications: A State-of-the-Art Review," *IBM Journal of Research and Development*, Vol. 28, No. 2, March 1984 pp. 124-134. In H-V parity, a parity bit for each row and column of a matrix of cells is generated and used for correction. ECC techniques are typically used in larger computer systems wherein data is read out in the form of multi-bit words. While this type of system-level ECC is now being used in smaller systems, it still adds a degree of both logic complexity and expense (due to added circuit cost and decreased data access speed) that makes it infeasible for less complicated systems. In these applications, memory performance/reliability suffers because there is no system-level ECC to correct for errors that occur after initial test.

The solution to this problem is to incorporate ECC circuitry onto the memory chip itself. This reduces the expense associated with ECC, while at the same time increasing the effective memory performance. U.S. Pat. No. 4,335,459, entitled "Single Chip Random Access Memory With Increased Yield and Reliability," issued Jun. 15, 1982 to Miller, relates to the general idea of incorporating Hamming code ECC on a memory chip. The stored data is read out in ECC words consisting of 12 bits (8 data bits, 4 check bits) that are processed by the ECC circuitry. The corrected 8 data bits are sent to an 8-bit register. The register receives address signals that select one of the 8 bits for output through a single bit I/O.

An article by Gandhi et al, entitled "Dynamic Random-Access Memories With On-Chip Error Checking and Correction," *IBM Technical Disclosure Bulletin*, October 1984 pp. 2818-19, also discloses the general idea of on-chip ECC, wherein read data is corrected using stored check bits, and wherein new check bits are generated by the ECC system for data to be stored in the DRAM arrays. The ECC system communicates with a static register.

U.S. Pat. No. 4,817,052, entitled "Semiconductor Memory With An Improved Dummy Cell Arrangement And With A Built-In Error Correcting Code Circuit," issued Mar. 28, 1989 to Shinoda et al and assigned to Hitachi, discloses a particular dummy cell configuration as well as the general idea of interdigitating the word lines so that adjacent failing cells on a word line will appear as single-bit fails (and thus be correctable) by the ECC system, because they will appear in different ECC words.

An article by J. Yamada, "Selector-Line Merged Built-In ECC Technique for DRAM's," *IEEE Journal of Solid-State Circuits*, Vol. SC-22, No. 5, October 1987, pp. 868-873, discloses an on-chip ECC system using H-V parity wherein the assignment of memory cells along a word line to positions within the H-V parity matrix is carried out in a diagonal fashion, such that adjacent cells along the word line are members of different H and V groups. This eliminates long selector lines that couple the cells to their associated H,V parity checkers. This, in combination with a two-tier parity checker, reduces the "possible" access penalty imposed by the on-chip HV parity system to be on the order of 5 nanoseconds. This general system is also disclosed in an article by T. Mano et al, entitled "Circuit Technologies for 16 Mb DRAMs," *IEEE International Solid-State Circuits conference 1987: Digest of Technical Papers*, Paper 1.6, pp. 22-23.

An article by T. Yamada et al, entitled "A 4-Mbit DRAM with 16-bit Concurrent ECC," *IEEE Journal of Solid-State Circuits*, Vol. 23, No. 1, February 1988 pp. 20-26, discloses an on-chip H-V ECC system in which all of the vertical parities are checked concurrently, eliminating the need for vertical parity selectors. As shown in FIG. 6 of the article, the memory chip passes data from the main sense amplifiers to a set of intermediate amplifiers, and from the intermediate amplifiers to the data latch through column decode switches. The ECC system is coupled in parallel between the intermediate amplifiers and the data output, for correcting the data.

An article by K. Arimoto et al, entitled "A Speed Enhanced DRAM Array Architecture With Embedded ECC," *IEEE Symposium on VLSI Circuits* 1989: *Digest of Technical Papers*, Paper 8-7, discloses a memory arrangement for supporting Hamming code on-chip ECC wherein the memory array consists of a plurality of bit line pairs that are coupled to sub I/O bus lines, which are in turn coupled to main I/O lines via a column decode operation. The bit line data is amplified twice during sensing, such that the main I/O lines (as well as the data register) is provided with amplified logic states. After sensing, the main I/O lines are isolated from the sub I/O bus lines to decrease loading. During the two-stage amplification, the ECC receives data on the sub I/O lines. Because the ECC has a minimum delay, and because it starts operating during the sense cycle, the first data read out in a page access mode cannot be error corrected. However, data read out thereafter is error corrected (see FIG. 5).

An article by M. Asakura et al, entitled "An Experimental 1 Mb Cache DRAM With ECC," *IEEE Symposium on VLSI Circuits 1989: Digest of Technical Papers*, Paper 4–5, discloses an on-chip SRAM cache for a DRAM supporting on-chip ECC. Accesses between the cache and the DRAM are carried out through the ECC circuitry.

Japanese Published Unexamined Patent Application JP 01-208799, published Aug. 22, 1989 and entitled "Semiconductor Storage Device," apparently relates to a method of shortening the access cycles for on-chip ECC systems. According to the English language abstract obtained from the JAPIO computer database, the patent application teaches the use of a separate high-speed memory array for storing the check bits of an ECC word stored in conventional DRAM arrays. According to the application, the check bits can be obtained faster, such that the total cycle time of the ECC system is reduced. However, the separate array is an SRAM which typically includes many more transistors and is thus more costly than DRAM memory cells. Furthermore, the use of a separate array necessarily involves the dedication of a separate and sizable piece of chip real estate for this purpose. Finally, the use of a separate array requires that it be supported by its own input/output circuitry.

Another solution to the delay problem is described in Japanese Patent Application 57-143800 assigned to Nippon Denki K.K. However, that application discloses a system in which the ECC circuitry and other functions are located on separate chips. Moreover, it involves the use of a separate array of memory cells for the check bits and it employs separate support circuitry for same.

In several references, both ECC circuitry and redundancy are incorporated on the same memory chip. Examples of such arrangements include U.S. Pat. No. 4,688,219, entitled "Semiconductor Memory Device Having Redundant Memory and Parity Capabilities," issued Aug. 18, 1987 to Takemae and assigned to Fujitsu (bit line redundancy incorporated with HV parity by use of a switching circuit that generates the parity bits for the redundant column line separately from the generation of the parity bits for the remaining cells); U.S. Pat. No. 4,768,193, issued Aug. 30, 1988 to Takemae and assigned to Fujitsu (an array contiguous to the main memory array provides both word line and bit line redundancy for an HV ECC system, wherein fuses are used to disconnect the faulty word line and/or bit line from the horizontal and/or vertical parity generators, respectively); and an article by Furutani et al, "A Built-In Hamming Code ECC Circuit for DRAM's," *IEEE Journal of Solid-State Circuits*, Vol. 24, No. 1, February 1989, pp. 50–56 (new ECC circuitry for an on-chip Hamming code system, with redundancy—the article does not discuss redundancy in any detail).

As is illustrated in the prior art discussed above, there are a host of known techniques for integrating ECC onto a DRAM chip. It is also clear that there is a wide divergence in the art as to the best way to minimize the access delays imposed by on-chip ECC. In general, the methods used in the art to minimize ECC delays require increased ECC complexity and/or changes to the DRAM data path. Such complexities add design expense and in some cases (e.g. the Arimoto paper) may compromise ECC operation. Accordingly, a need exists in the art for enhancing on-chip ECC performance without introducing such design complexities.

SUMMARY OF THE INVENTION

Accordingly, it is an object of the invention to provide on-chip ECC for a DRAM that introduces a minimum of delay to the DRAM data path.

It is another object of the invention to provide on-chip ECC for a DRAM that minimizes access delays without compromising the operation of the ECC.

It is yet another object of the invention to synchronize all of the elements of the ECC system so as to minimize delays while enhancing reliability.

It is yet another object of this invention to provide a memory device which is particularly useful to avoid delay in storing data words, some bits of which are available for storage later than others.

It is a further object of this invention to provide a memory device having an on-chip ECC system in which little or no delay will occur in write-back operations due to the time required to calculate check bits.

It is a further object of this invention to provide a memory device of the type described involving only minor increased use of chip real estate.

The foregoing and other objects of the invention are realized by an on-chip ECC system in which the data flow between the DRAM arrays, the ECC, and the register that stores the corrected data is synchronized by a combination of interlocks and clocking signals, so as to minimize both access and cycle time delays without compromising ECC performance. The objects of this invention are further realized through the use of a special DRAM array in which certain memory cells are specially configured for faster access than the remaining cells of the array.

In one aspect of the invention, a dummy data line is added that simulates the performance of the data lines from the DRAM arrays. When the dummy data line changes state, it indicates that the slowest ones of the DRAM data lines have been set by the DRAM arrays. As a function of the signal from the dummy data line, the data inputs to the ECC circuitry are enabled, such that the ECC latches valid logic states of the DRAM cells.

In another aspect of the invention, during write-back operation the same dummy data line is used to indicate to the DRAM arrays that incoming data from an on-chip data register supporting ECC is at valid logic states.

In yet another aspect of the invention, a first fast interlock signal is generated sufficiently ahead of the data being valid in the data register such that the clock circuitry supporting data transfers from the ECC to the I/O pins provides control signals when the data is valid. A second slower interlock signal is subsequently generated to restore the ECC system when the data is valid in the data register.

In yet another aspect of the invention, the apparatus of this invention is a fast write DRAM system using an array of memory cells having a plurality of data bit cells having a predetermined access speed for storing data bits and at least one additional plurality of data bit cells having a relatively faster access speed for storing bits whose availability for storing is delayed.

The method of this invention is likewise employed for fast storing of a collection of data bits, one group of which is available for storing relatively early and one or more additional groups of which are delayed, the method comprising the steps of writing the early data bits into memory cells having a predetermined access speed as soon as said early bits are ready to be stored and then writing the delayed data bits into one or more sets of faster memory cells in common array with the first as soon as said delayed bits are ready to be stored.

BRIEF DESCRIPTION OF THE DRAWING

The foregoing and other structures and teachings of the present invention will become more apparent upon a review of the description of the best mode for carrying out the invention as rendered below. In the description to follow, reference will be made to the accompanying Drawing, in which.

DETAILED DESCRIPTION OF THE BEST MODE FOR CARRYING OUT THE INVENTION

Figure 1:
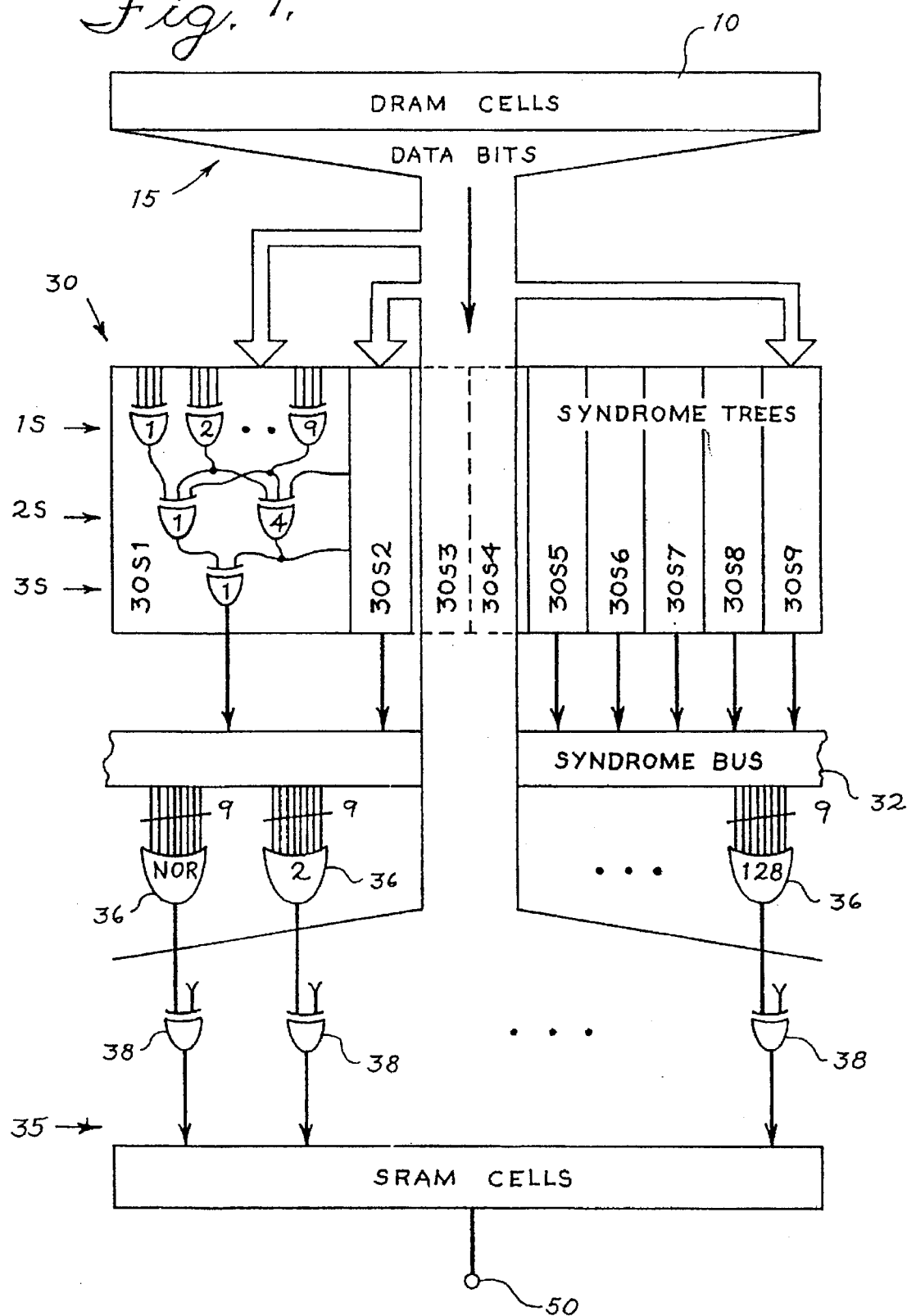
FIG. 1 is a block diagram of a DRAM with the on-chip ECC of the invention.

With reference to FIG. 1, a general block diagram of a DRAM with on-chip ECC is shown. The DRAM array 10 is coupled to the ECC block 30 by a plurality of pre-data lines (PDLs) 15. Corrected data from the ECC 30 is sent to an SRAM 40, from which it is accessed through I/O 50. While the memory array of the invention could be of any configuration/density, it is preferred that array 10 comprise a 4 Mb quadrant of a 16 million bit (16 Mb) DRAM chip. Thus, such a chip would have four separate ECC systems on-chip. The memory cells are of the conventional "one device" DRAM type (i.e. an FET having its gate coupled to a word line, its drain coupled to a bit line, and its source coupled to the storage capacitor, wherein a sense amplifier coupled to the bit line compares the voltage from the capacitor to a reference voltage from a reference cell to determine the stored logic state), as generally described in U.S. Pat. No. 3,387,286 issued June 1968 to Dennard and assigned to IBM. Although the cells can be construed using any one of a number of known techniques, it is preferred that substrate-plate cells be used (wherein the storage plate of the storage capacitor is formed by doped poly disposed in a trench that extends through epitaxial layers to the underlaying substrate that forms the charge plate—see U.S. Pat. No. 4,801,988, issued January 1989 to Kenney and assigned to IBM, the teachings of which are incorporated herein by reference).

The DRAM array consists of 4096 word lines and 1096 bit line pairs. That is, in the memory array of the invention it is preferred to use the folded bit line configuration of U.S. Pat. Reissue No. 32,284. The DRAM array receives control signals ROW ADDRESS STROBE (RAS) and COLUMN ADDRESS STROBE (CAS) from the memory controller. When RAS falls, memory operations commence, and address signals are buffered and decoded to couple two of the 4096 word lines to the array sense amplifiers coupled to the bit lines (preferably the sense amplifiers comprise NMOS and PMOS cross-coupled devices). Subsequently, when CAS falls the input address signals are decoded to determine which bit lines are to be accessed. However, per the teachings of co-pending Ser. No. 479,145, only a ⅛ decode is done at the array. That is, of the 1096 bit line pairs in the array 10, 137 will be coupled to the pre-data lines 15. Thus, the array provides an error correction word ECW of 137 bits, of which 9 are check bits and 128 are data bits. The remaining address bits at CAS falling are used to access one or more of the bits at the SRAM 40.

The 137 pre-data lines 15 are driven by the cell data to provide inputs to the ECC 30. By "driven," we mean that the PDLs are precharged high, such that when the bit switches turn on to couple the PDLs to the selected bit lines, some of the PDLs are driven from the high voltage (e.g. 3.3 volts) to a low voltage (ground). While as a practical matter any data bussing configuration could be used, in practice it is preferred that the PDLs be disposed above (and criss-cross over) the bit lines of the DRAM array 10, so as to equalize capacitive coupling there between, co-pending Ser. No. 479,145.

The ECC block 30 utilizes an odd-weight Hamming code, which provides a double error detect, single error correct (DED/SEC) capability. While other codes (e.g., horizontal-vertical parity) could be used, odd-weight Hamming code is preferred because it provides the best error coverage at the lowest cost (for a more detailed comparison between odd-weight ECC codes and other codes, see the article by N. Jarwala et al entitled "Cost Analysis of On Chip Error Control Coding for Fault Tolerant Dynamic RAMs," *Proceedings of the Seventeenth International Symposium on Fault-Tolerant Computing*, Pittsb. Pa., July 6–8, 1987, pp. 278–283).

While the operation of the ECC block will be discussed in detail with reference in FIG. 2, the general operation of the major functional blocks for the ECC will now be described with reference to FIG. 1. The ECC block 30 comprises four main parts: syndrome generators 30S1–30S9, syndrome bus 32, NOR gates 36, and XOR gates 38.

As shown within syndrome generator 30S1, each generator (or "syndrome tree") is made up of three stage exclusive-OR (XOR) logic trees. The first stage 1S of the logic tree is made up of a first set of four-input XOR gates; the second stage 2S is made up of approximately four four-input XOR gates; and the final stage 3S is a single four-input XOR gate. Note that the syndrome generators 30S1–30S9 have different numbers of inputs (specifically 51, 59, 59, 59, 55, 59, 60, 47, and 56 respectively) to optimize the interconnect wiring layout. The three stages of XOR of one syndrome generator provide the parity of a subset of the one hundred and twenty eight data bits. This generated parity bit is then compared to a corresponding one of the stored check bits for that error correction word. The comparison operation, which is the XOR of a specific subset of PDL lines 15 and their corresponding stored check bits is executed by 1S, 2S and 3S. For the purposes of illustration, assume the arrowhead going into bus 32 is the result of this XOR operation. This XOR result is referred to as a syndrome bit, which is coupled to a respective line of a syndrome bus 32. The syndrome bus 32 is 18 bits wide (it carries the true and complement of each of the 9 syndrome bits). The inputs to the first stage S1 of each syndrome generator 30S1–30S9 are subsets of the 128 data bits. Each syndrome generator receives a unique set of data bits, in accordance with the error correction code requirements. In other words, these XOR inputs are wired to calculate the parity of selected subsets of the 128 bit data word according to a parity check matrix defining the error correction code used.

The bits of the syndrome bus are provided to the inputs of 128 NOR gates 36, one for each of the 128 data bits for the error correction word. The NOR gates work the same way as convention address decoders; the syndrome bits in combination indicate which of the 128 PDLs are carrying a bad bit. The outputs of the NOR gates 36 are sent to one input of XOR gates 38, each of which also receive a corresponding data bit. Should a given NOR gate indicate that its corresponding PDL is carrying bad data, the corresponding XOR 38 will simply invert the data on that PDL.

The data bits as corrected by the ECC are then passed by data lines 35 at the output of the XORS 38 to SRAM 40. The SRAM (or data register) 40 consists of a plurality of conventional four-device cross-coupled cells. From the SRAM, data is passed to the I/O pin 50 under the control of clock drivers (not shown) activiated during the CAS cycle to select and drive data from one or more of the SRAM cells.

Figure 2:
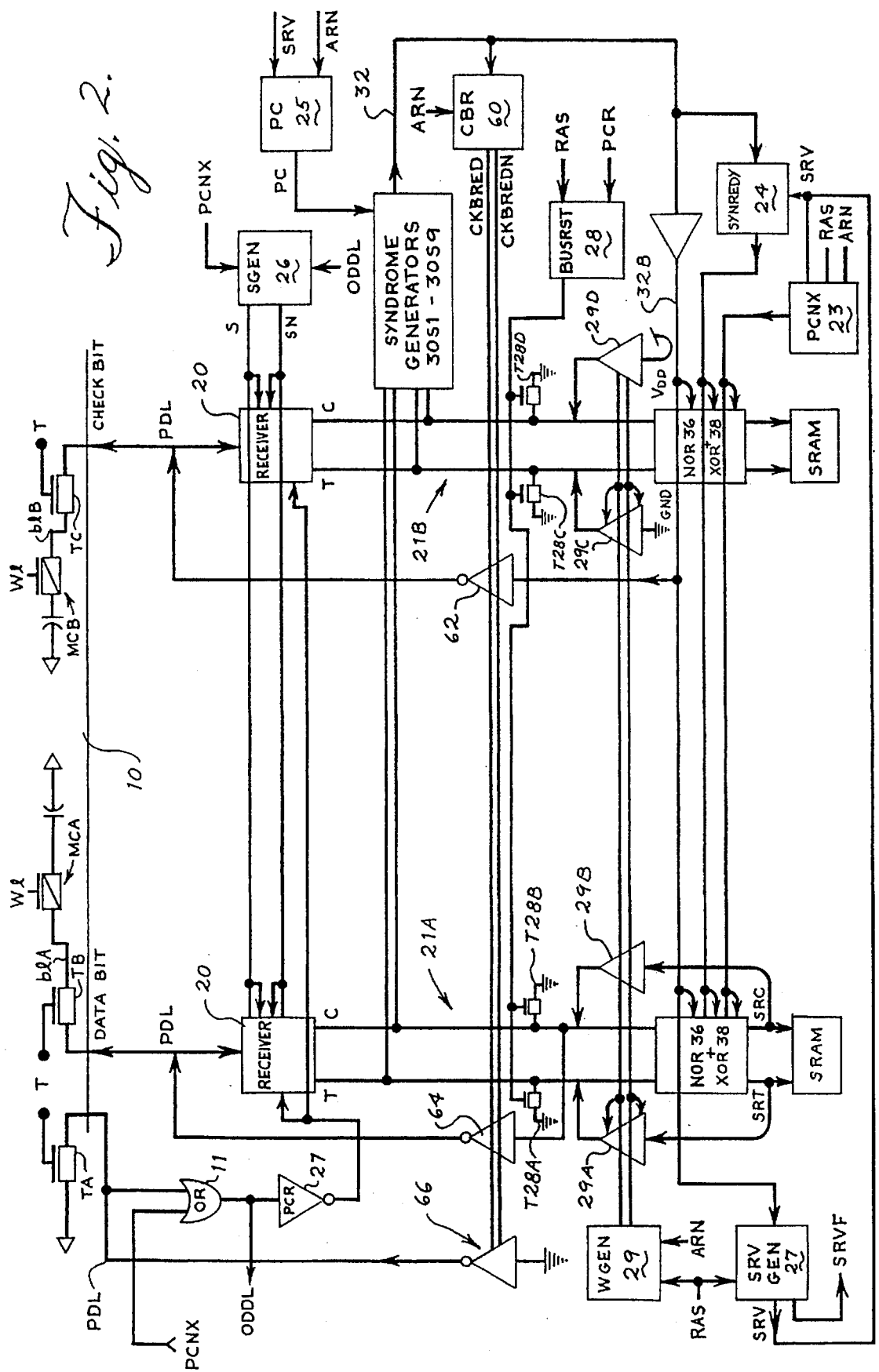
FIG. 2 is a detailed block diagram of the ECC system of FIG. 1.

Referring now to FIG. 2, the interlocked ECC system of the invention will be described in detail. In the description to follow, reference will be made to a "fetch" operation (wherein data is transferred from the DRAM array 10 through the ECC 30 to the SRAM 40) and to a "write-back" operation (wherein data is transferred from the SRAM 40 through the ECC 30 to the DRAM array 10). The ECC circuitry of the invention receives 128 data bits and 9 check bits for each ECC word. For ease of illustration, these bits are shown schematically as a single data bit DB and a single check bit CB.

Figure 3:
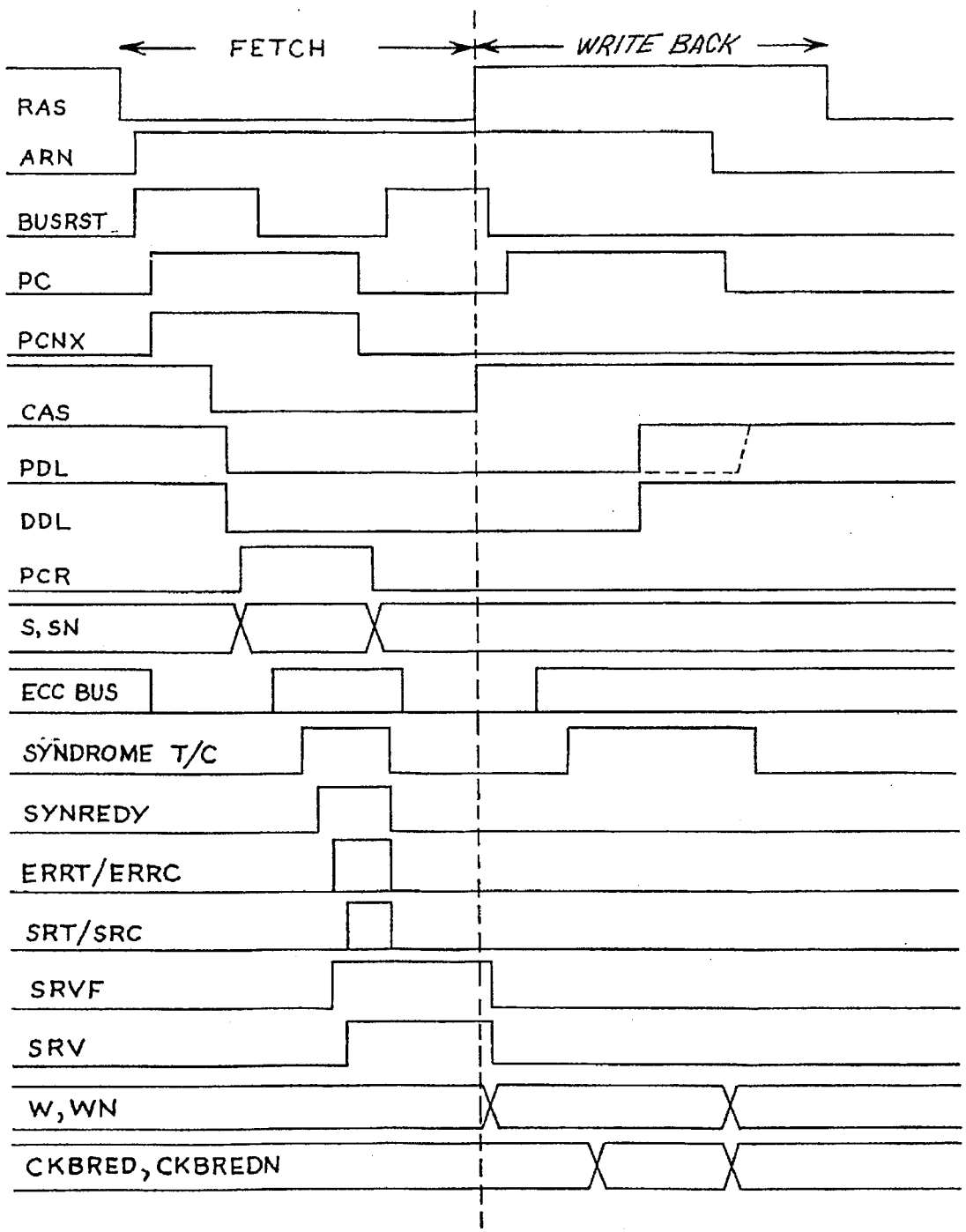
FIG. 3 is a waveform diagram showing the states of various signals within the ECC system of FIG. 2.

First, the fetch operation of the invention will be described with reference to both FIG. 2 and the waveform diagram of FIG. 3. Prior to initiation of the fetch cycle, both RAS and CAS are high, and the various clock drivers are in their restore state. The start of the fetch cycle is indicated by the falling edge of RAS. RAS going low causes the signal ARRAY RESTORE PHASE (ARN) to rise. ARN is used to take the ECC circuitry directed to fetching out of restore. Specifically, ARN rising drives the PC and PCNX generators 23, 25 high, which readies the syndrome generators 30S1–30S9 as well as the NOR/XOR gates 36, 38 to receive inputs. At the same time, ARN rising enables the T/C receivers 20 to begin operation. At the falling edge of RAS, BUSRST 28 turns on to clamp the ECC busses 21A–21D to ground via NMOS devices 28A–28D, respectively.

As shown in FIG. 2, one of the PDLs from the DRAM array 10 is a dummy PDL (or DDL). The DDL provides the same general performance characteristics as the PDLs coupled to the memory cells. In other words, the DDL is coupled to a ground line via a device TA that has the same performance characteristics as the bit switch devices TB, TC that couple the normal PDLs to the bit lines blA, blB coupled to the selected word line wl via memory cells MCA, MCB, respectively. Note that transfer devices TA–TC are enabled by the same signal T in practice, the signal enabling device TA would be derived from (e.g. a NOR of) all the transfer signals; signal T couples selected bit lines to the PDLs. The DDL conductor itself is formed the same time as the PDLs' thus, since it is driven by a device having approximately the same size as the PDL drivers TB, TC, it will have the same rise/fall times as the PDLs.

The DDL is precharged high, as are the PDLs. When the bit switches TB, TC of the memory array are turned on by the column decoders providing signal T once CAS falls, the coupling device of the DDL TA turns on to discharge the DDL to ground. As a practical matter, the loading on the DDL is slightly greater than that of the normal PDLs such that the DDL simulates the worst-case delay associated with the normal PDLs being set to their respective logic states. The DDL is coupled to a large buffer 27 (actually a series of two conventional CMOS inverters) by means of a 2-input OR device having a second input coupled to logic restore phases PCNX, which is high during the early portion of the fetch cycle. The output PCR of buffer 27 is sent to the ECC T/C receivers 20.

Figure 4:
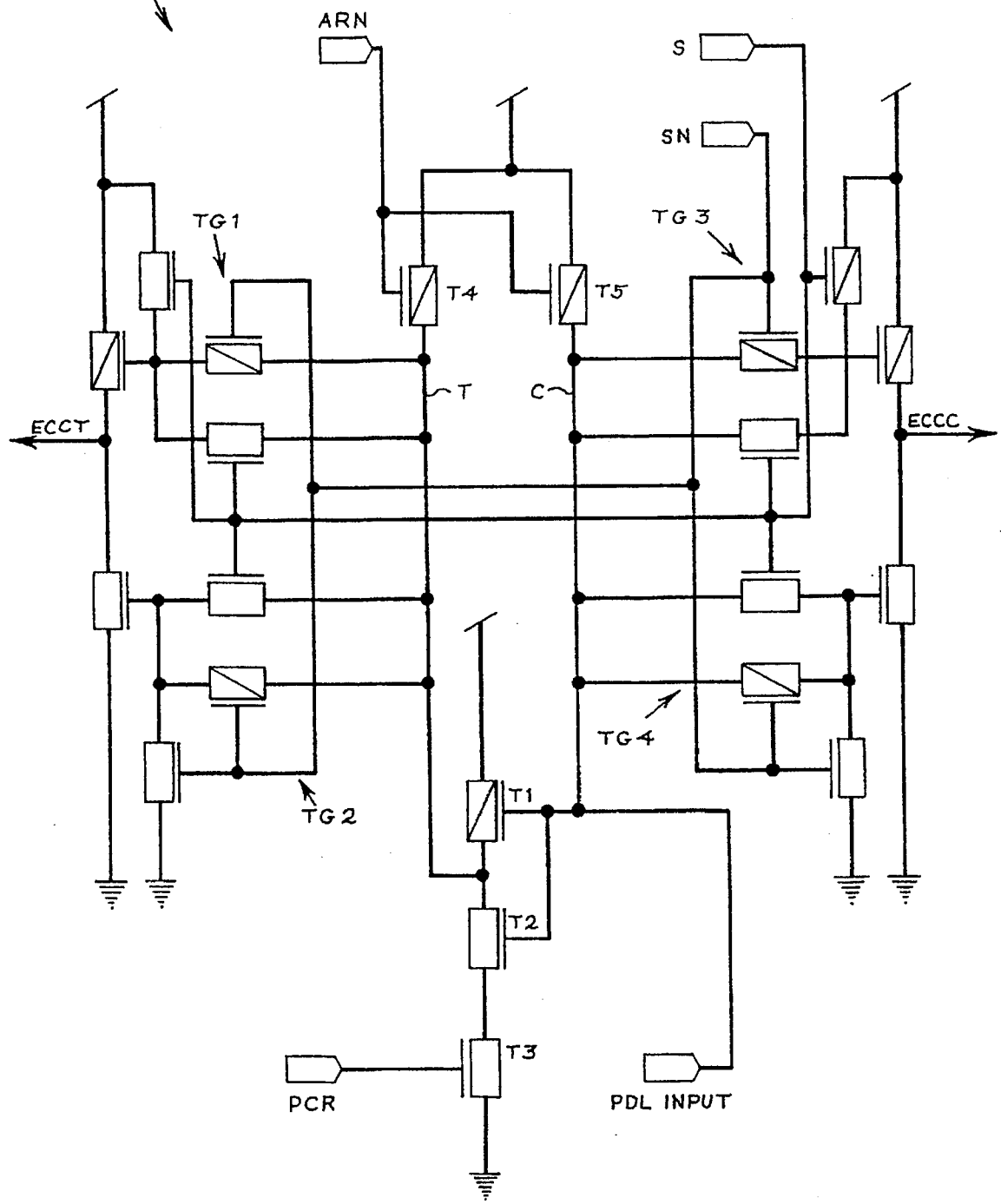
FIG. 4 is a circuit diagram of the ECC T/C receivers 20.
Figure 5:
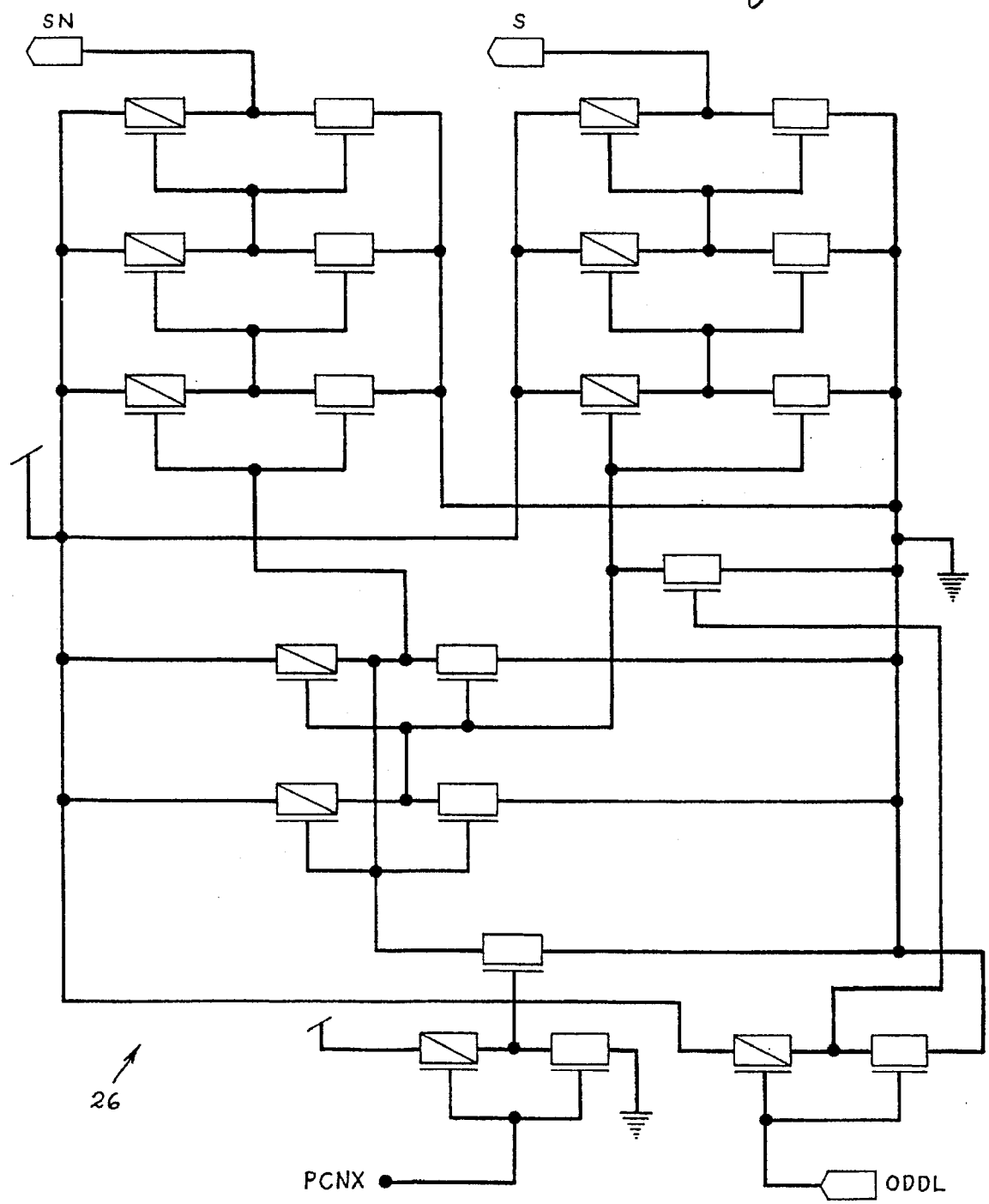
FIG. 5 is a circuit diagram of the SGEN generator 26.

The ECC T/C receivers 20 are shown in detail in FIG. 4. The ARN signal rising turns off PMOS devices T4, T5, allowing the differential lines T, C to float. The S and SN signals from SGEN 26 (particularly, with S being high and SN being low) provide enable inputs to the CMOS transmission gates TG1–TG4. As shown in FIG. 5, SGEN 26 is enabled by PCNX, and generates buffered S, SN outputs when ODDL (the unbuffered version of PCR, taken from the output of OR gate 11) falls. Referring back to FIG. 4, the receiver 20 is not completely enabled until it receives the signal PCR from the dummy PDL that turns on NMOS T3. With T3 on, the CMOS inverter T1, T2 is activated, such that if the data from the PDL input is high, line T will be set to a low state and line C will be set to a high state, which will be passed by the respective CMOS transmission gates TG1–TG4 to the inverting outputs, such that ECCT will be high and ECCC will be low. Thus, by virtue of the interlocking function provided by the DDL, the ECC T/C receivers 20 will not set the ECC busses 21A, 21B until the PDL inputs thereto are valid. By "valid," we mean that the PDL has been pulled sufficiently low (at least to the "maximum positive down level (MDDL)," which is the highest voltage indicating a binary logic state of 0) such that the data thereon can be reliably read. In the case of CMOS, the MPDL is on the order of 0.7 volts, and the "minimum positive up level (MPUL)" (the lowest voltage indicating a binary logic state of 1) is on the order of 1.4 volts. This interlock prevents the input to ECC of erroneous data due to setting the ECC busses prior to adequate signal development on the PDLs. At the same time, because the remaining circuitry (the internal T/C lines, the CMOS transmission gates) of the receivers 20 are enabled just prior to the PCR signal by ODDL, once the PCR signal rises the receiver can operate without further delay.

Note from FIG. 2 that the ECCT, ECCC outputs of ECC T/C receivers 20 (corresponding to ECC busses 21A, 21B are held at ground by BUSRST during the early part of the fetch cycle. When PCR rises, the BUSRST generator 28 lowers the BUSRST signal, such that the ECC bus lines 21A, 21B can be driven by the ECCT, ECCC outputs of the receivers 20.

Figure 6:
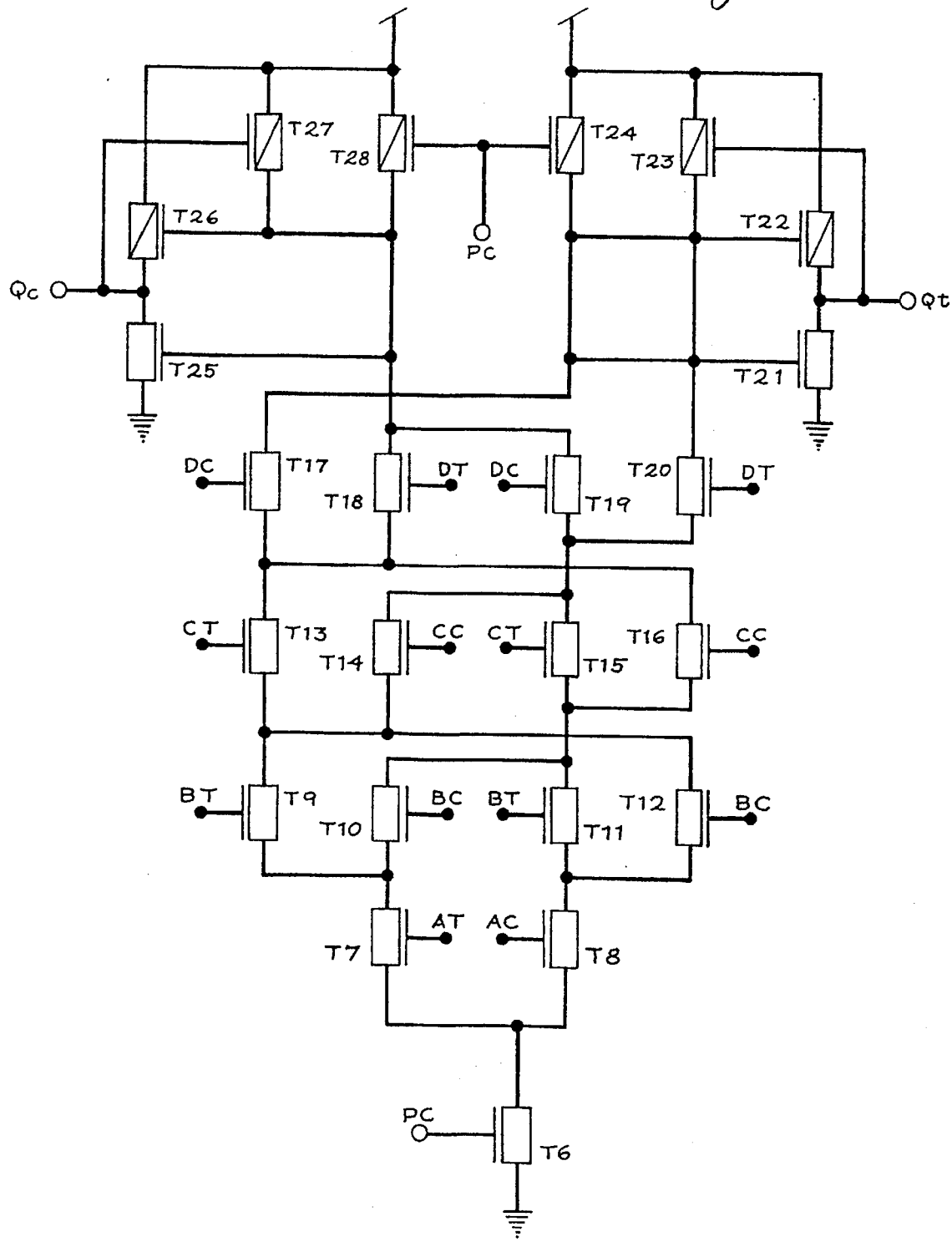
FIG. 6 is a circuit diagram of one of the DCVS XOR gates within one of the syndrome generators 30S1–30S9.

As previously described, the data from the ECC busses is passed to the DCVS syndrome generators 30S1–30S9, which in turn provide the syndromes onto the 9-bit syndrome bus 32. While as a practical matter the XOR gates within syndrome generators 30S1–30S9 could be provided using any conventional logic, it is preferred that differential cascode voltage switch (DCVS) logic be utilized. DCVS is described in detail in U.S. Pat. No. 4,570,084, issued February 1986 to Griffin et al, the teachings of which are incorporated herein by reference). FIG. 6 is a circuit diagram of a DCVS 4-input XOR. Transistors T7 through T20 form the N-type combinational logic of a 4-input XOR function with differential inputs AT, AC to DT, DC. Since phase PC is driven high at the start of the fetch cycle, the differential output of the XOR of differential inputs A, B, C and D from T/C receivers 20 is driven to nodes Qt and Qc by inverters formed by T21, T22, T25 and T26. Leakage protection is provided by soft latching action of T23 and T27. Note that the syndrome generators are self-timed; that is, there are no enable/trigger clock signals that activate the syndrome generators as there are for the T/C receivers 20. The syndrome generators are effectively synchronized by clocking of the the T/C receivers. That is, because the operation of the T/C receivers insures that the T/C inputs to the syndrome generators are valid, there is no need for independent clocking for the syndrome generators.

Figure 7:
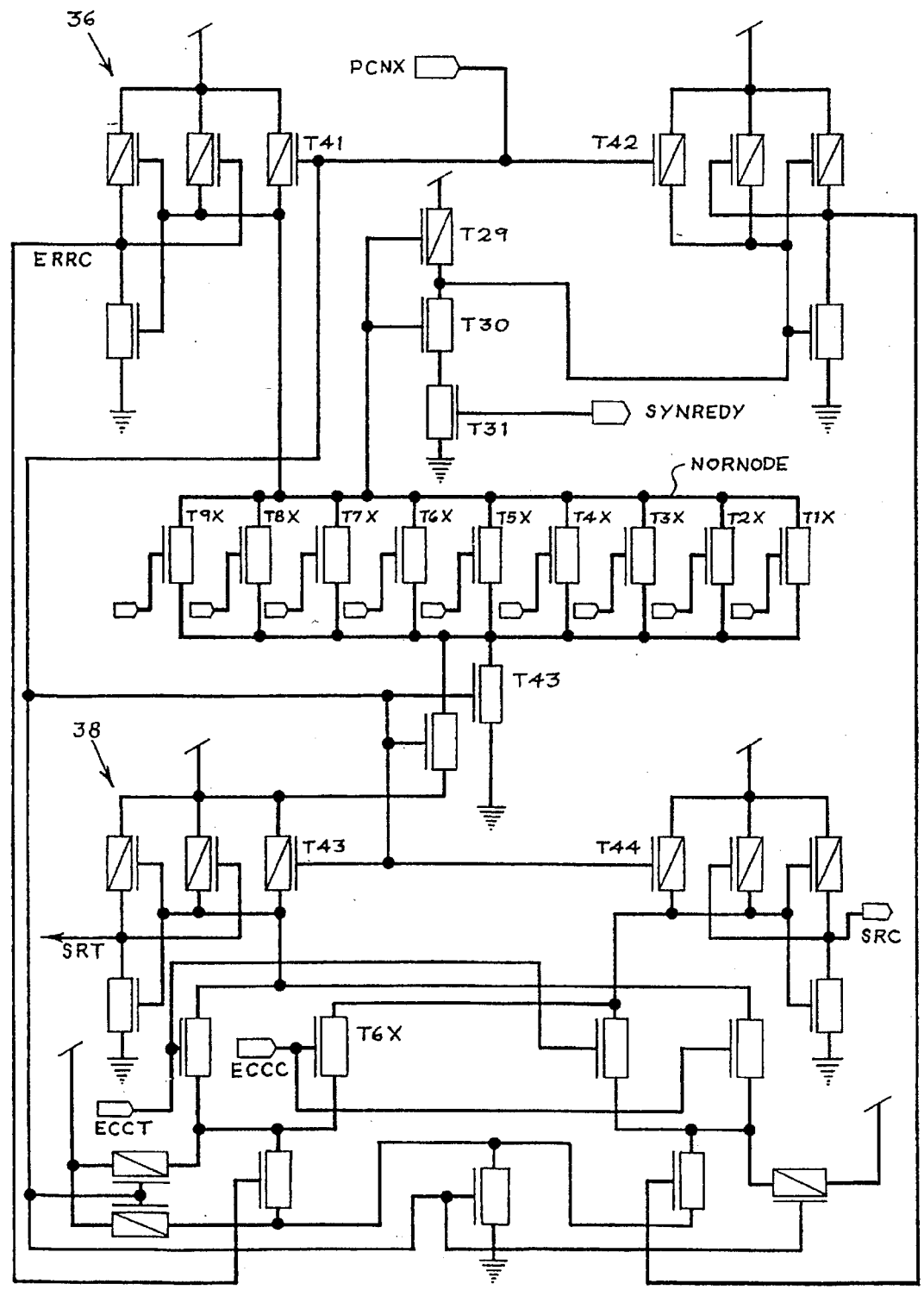
FIG. 7 is a circuit diagram of the NOR/XOR logic 36, 38.
Figure 8:
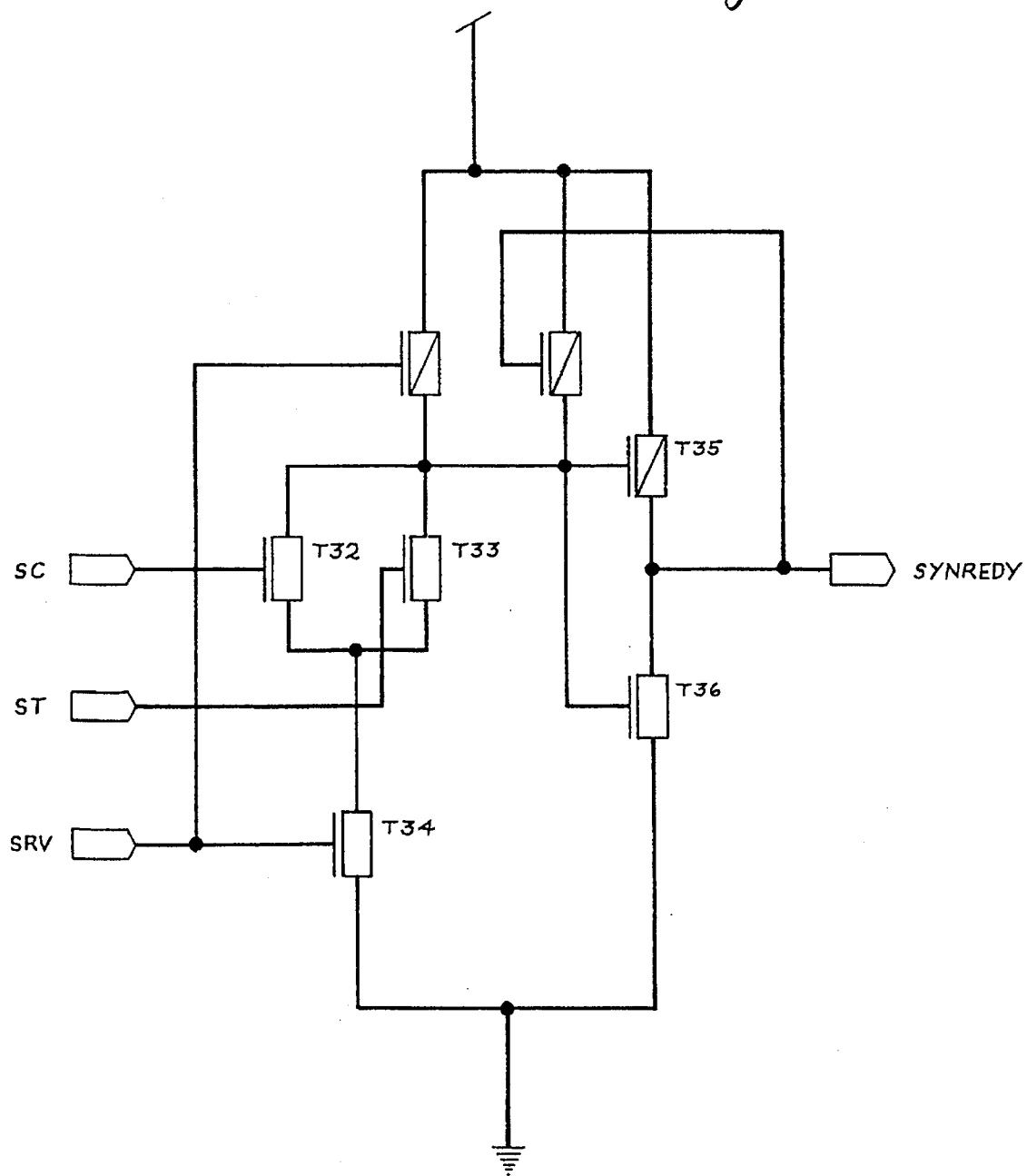
FIG. 8 is a circuit diagram of the SYNREDY clock generator 24.

The NOR/XOR logic 36, 38 are shown in more detail in FIG. 7. Note that the output of the NOR node within block 36 defined by NMOS transistors T1X-T9X is enabled by NMOS T31, which receives an interlock pulse SYNREDY from SYNREDY generator 24. The ERRC output will rise at the falling edge of NORNODE. On the other hand, ERRT will rise if NORNODE remains high, and only when SYNREDY enables clocked inverter formed by T29–T30. As shown in FIG. 8, the SYNREDY generator 24 produces an output when one of the syndrome bits SC, ST from syndrome bus 32 rise to indicate that syndrome bus 32 is active. Note that the relative sizes of devices T32-T34 are set such that the SYNREDY pulse is not generated until the SYNDROME inputs to T1X–T9X of the NOR node of NOR gate 36 are valid and NORNODE is at its valid level. Specifically, these devices are significantly longer/wider than the devices that make up the NOR node, to introduce a discrete delay. Briefly, when either SC or ST rise, the corresponding transistor T32, T33 will turn on, coupling the gate of PMOS T35 low, such that the SYNREDY output rises through inverter T35, T36. Thus, the generation of the ERRT, ERRC pulses is interlocked with the generation of syndrome data. More specifically, the output of the NOR node within block 36 is not enabled until the SYNREDY pulse rises to indicate that sufficient time has passed since the syndrome bits were valid to assure proper operation of the NOR decode. Again, this prevents premature outputs from the NOR decoder from erroneously indicating an error condition.

The remaining operations of the system (i.e., firing of the XORs within block 38 to correct the bad bit, and passage of the data bits as corrected to the SRAM registers) are self-timed, relying on the above self timed nature of DCVS logic gates. Specifically, the XOR 38 receives ERRT, ERRC from NOR 36 and ECCT, ECCC from the T/C receivers 20, and carries out an XOR operation to provide the outputs SRT, SRC that are sent to the data registers 40.

Figure 9:
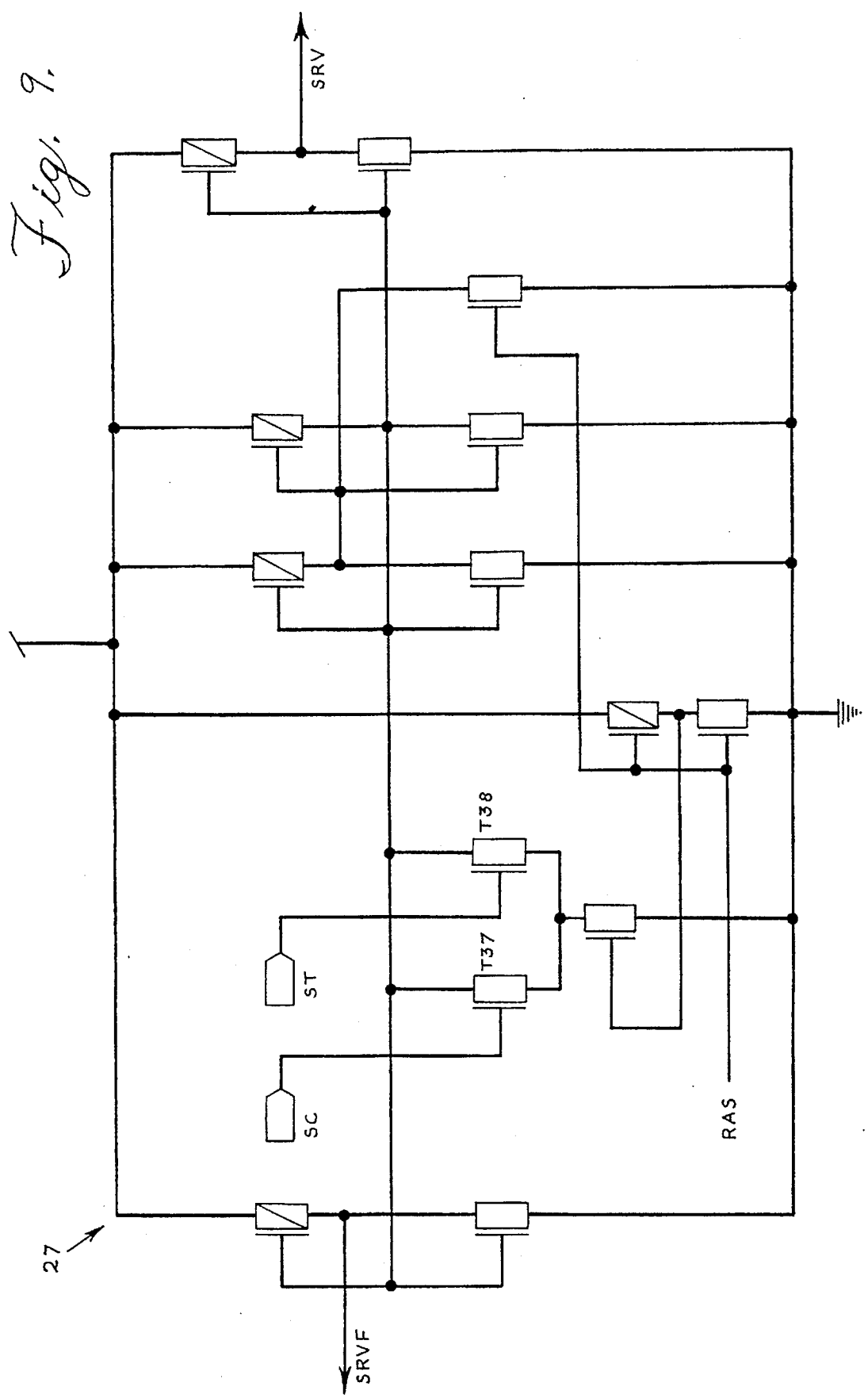
FIG. 9 is a circuit diagram of the SRV generator 27.

After the fetch operation as described above, the ECC circuitry must be restored so that it can be driven quickly during a subsequent write-back cycle. This restore is triggered by the SRV generator 27. The SRV generator as shown in FIG. 9 receives its inputs SC, ST from the bus 32B. The SRV and SRVF outputs of generator 27 will rise when the syndrome bits on bus 32B are valid by turning on one of devices T37, T38. These SRV and SRVF signals are used for different purposes. First, SRVF rises to enable the clock driver (not shown) that controls the transfer of corrected data latched by the SRAM cells to the I/O pads of the chip. Because these clock drivers add considerable inverter delays, SRVF is generated before the SRAM nodes are actually valid. That is, the delay associated with the clock drivers is factored into the SRVF timing, such that by the time the clock drivers enable data transfer from the SRAM, the data therefrom will be valid. SRV rises approximately $3/10$ nanoseconds after SRVF, to restore the ECC circuitry. Again, although SRV is generated prior to the SRAM nodes being actually valid, the inverter delays associated with restoring the ECC circuitry are such that by the time the circuit outputs are driven to their restore states the SRAM nodes will be valid. Thus, ECC restore is timed to occur at the end of the RAS cycle, and is interlocked to the provision of valid data to the SRAM register blocks. This prevents the ECC from being restored until it has had an opportunity to process the DRAM data. Moreover, the driver devices of SRV are sized such that the SRV signal will rise after the SRT and SRC outputs of the ECC error indicator and corrector blocks have updated the SRAM cells with the correct data.

Figure 10:
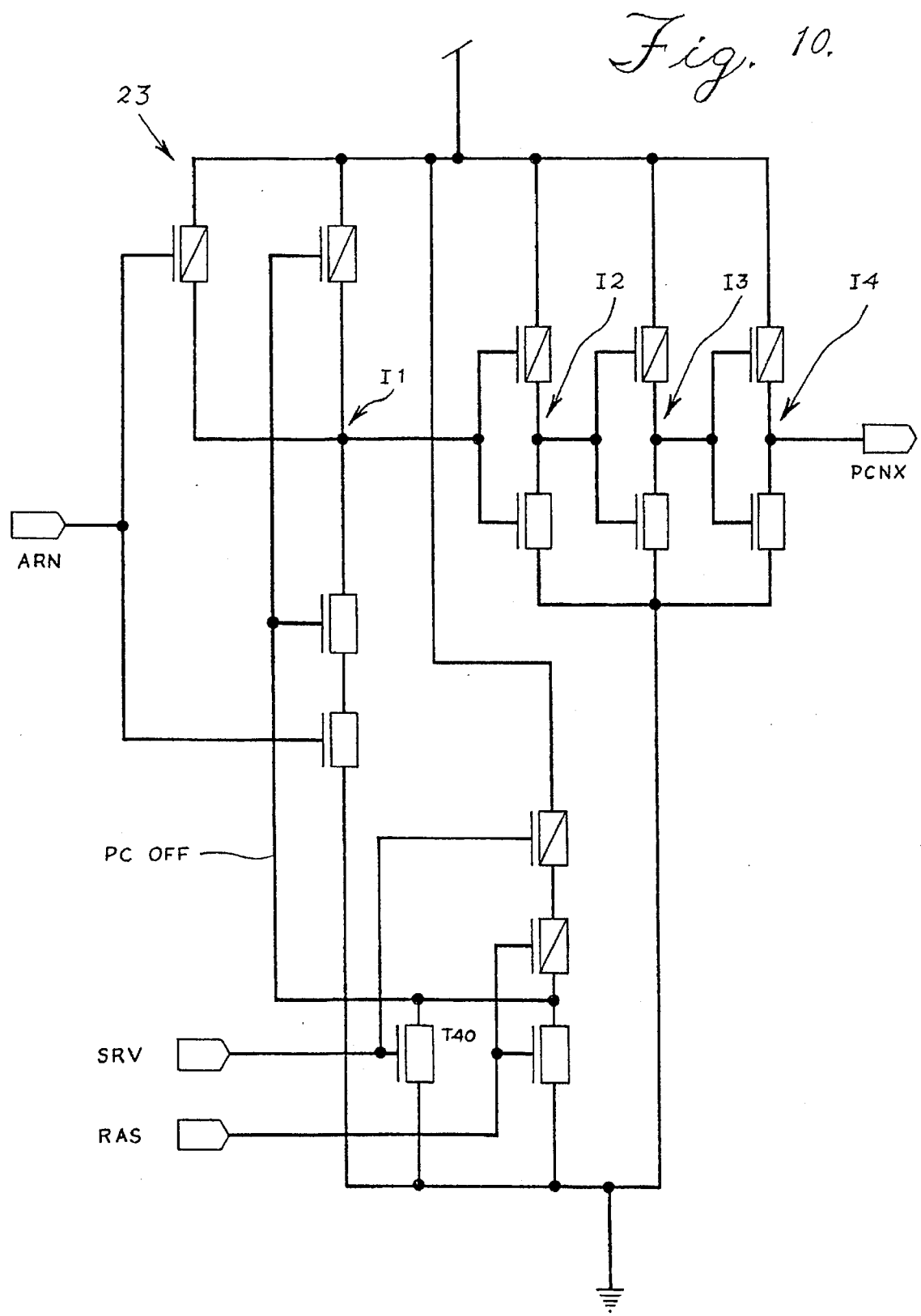
FIG. 10 is a circuit diagram of the PCNX clock generator 23.

As shown in more detail in FIG. 10, SRV rising will turn turn off the PCNX output of generator 23, to disable the ECC error detection and correction circuitry 36, 38. Specifically, when SRV rises NMOS T40 will turn on, coupling node PCOFF to ground. PCOFF forms the input to four inverter stages I1–I4, that buffer the PCNX signal to drive the large load presented by the NOR/XOR block 36, 38. Thus, the PCNX output is driven low. Referring back to FIG. 7, note that the PCNX input disables the ERRC, ERRT outputs by turning off devices T41, T42; disables the NOR node by turning on device T43; and disables the XOR drivers by turning on PMOS devices T43-T44. The falling edge of PCNX also causes the S, SN outputs of SGEN 26 to change state, which turns off the CMOS transmission gates TG1–TG4 of the ECC T/C receivers 20. The falling edge of PCNX also turns off the OR gate 11, such that PCR falls to both disable the PDL inputs of the ECC T/C receivers 20 and restore the ECC busses 21A, 21B to ground by raising the output of the BUSRST generator 28.

Finally, SRV also drives the output of PC generator 25 low, disabling the DCVS logic of the syndrome generators (See FIG. 6).

The write-back cycle will now be described. With reference to FIGS. 2 and 3, the start of the write-back cycle is indicated by RAS rising. RAS going high restores the SRV generator 27, causing both SRV and SRVF outputs to fall to ground shortly after RAS rises. The rising edge of RAS also serves to reset the BUSRST generator 28, such that the ECC busses 21A, 21B are disconnected from ground by turning off the NMOS devices 28A–28D. The fall of SRV serves to pull the PC generator 25 out of restore, to again enable the syndrome generators 30S1–30S9.

Figure 11:
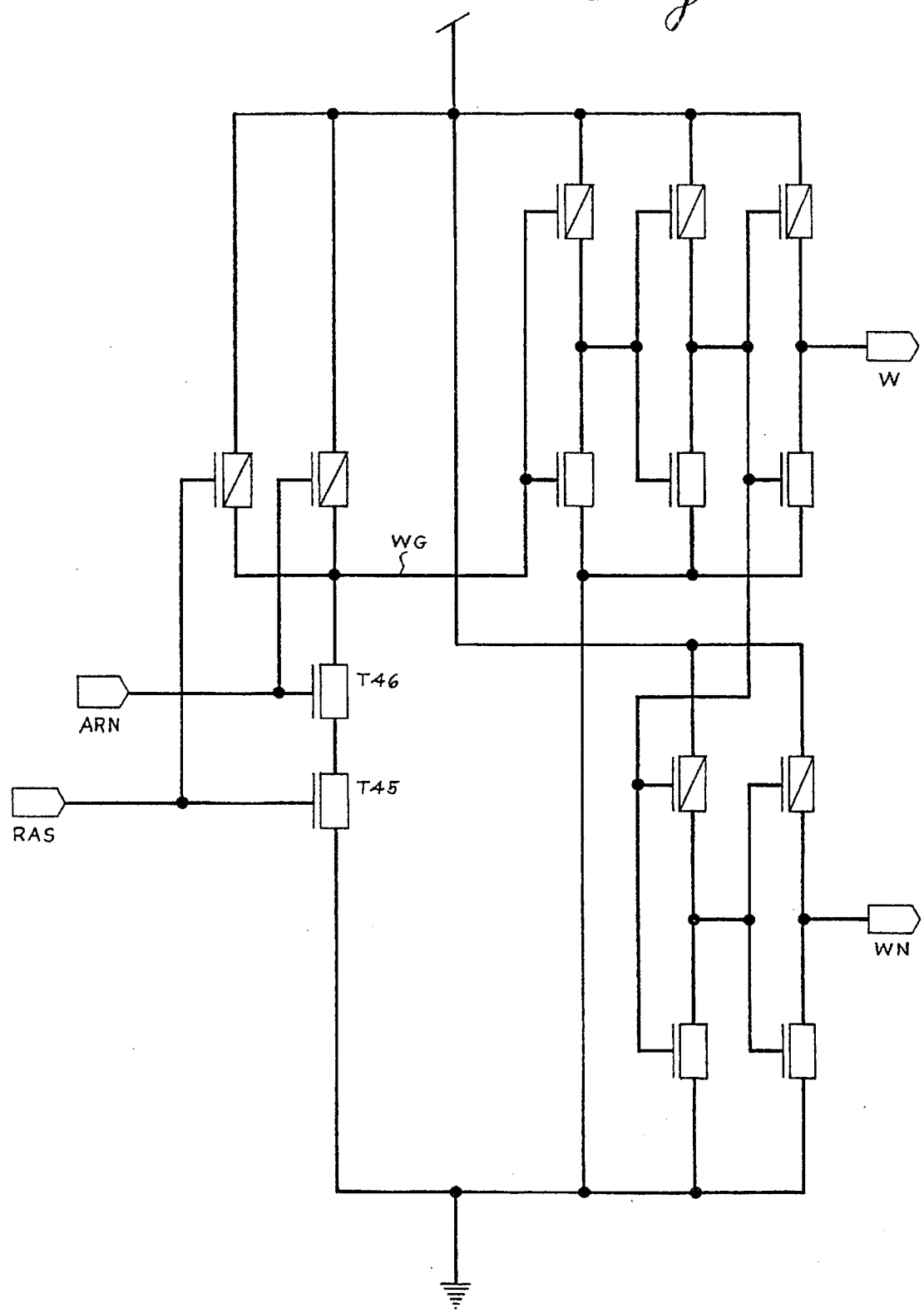
FIG. 11 is a circuit diagram of the WGEN generator 29.

As shown in FIG. 11, the rising edge of RAS also serves to turn on device T45 of the write generator WGEN 29. Since ARN is still high at this time, the node WG is pulled low, pulling the W output high and the WN output low.

These signals are fed to SRAM buffers 29A–29D. During a write-back cycle, the SRAM buffers 29A, 29B receive data bits SRT, SRC from each of the SRAM cells. This reception is enabled by the W, WN signals, which cause the SRAM buffers 29A, 29B to pass the SRT, SRC bits to respective lines within the ECC bus 21A. However, in the case of the SRAM buffers 29C, 29D, note that their inputs are wired to ground and Vdd, respectively (that is, when enabled by the W, WN signals, the SRAM buffers 29C, 29D pass ground and Vdd, respectively, to the ECC bus lines 21B). In combination, these signals provide a logical input of "0" to the ECC bus 21B, such that all the check bit inputs to the syndrome generators 30S1–30S9 are zero.

This is done because the syndrome generators are used to generate new check bits for the data during the write-back cycle. As previously described, the input data bits are applied to the ECC bus 21A. As described with reference to the fetch cycle, the syndrome generators 30S1–30S9 will generate check bits based on this data. However, because all of the input check bits are "0," the generated check bits will be directly passed to form new check bits (that is, unlike the fetch operation, a comparison between the newly-generated check bits and the old check bits is not carried out).

Once the new check bits are generated by syndrome generators 30S1–30S9, they are passed onto the syndrome bus 32 as described for the fetch cycle. As the check bits are passed to the bus, one of them are sent to the check bit read (CBR) generator 60. The CBR generator is configured the same way as the syndrome ready SYNREDY generator 24, and it performs the same function of providing an output (in this case, by switching its output states such that CKBRED is high and CKBREDN is low) when the bits on the syndrome generator 24 have risen sufficiently such that their logic states can be reliably processed. These signals enable the write-back inverter 62 to pass the newly-generated check bits from the syndrome bus 32 to the PDL corresponding to the ECC bus 21B.

Figure 12:
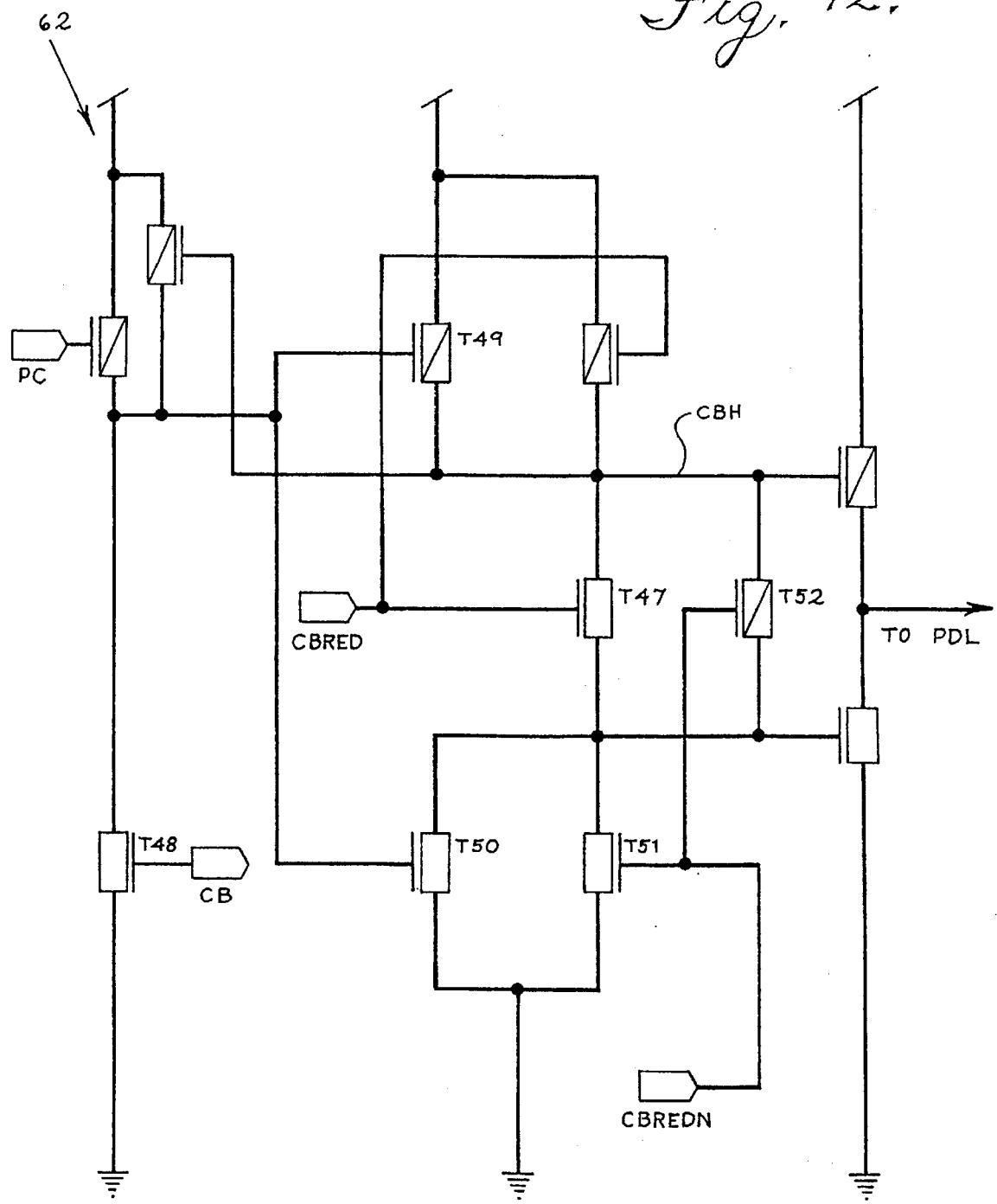
FIG. 12 is a circuit diagram of the write-back drivers 62–66.

Write-back inverter 62 is shown in detail in FIG. 12. When CBRED is high, NMOS T47 is on. If the input check bit CB is high, NMOS T48 will turn on, pulling the input to T49 and T50 low. Thus, T47 will be isolated from ground while T50 turns on to clamp node CBH high, so as to supply a high signal to the PDL output. If the check bit CB is low, device T47 is connected to ground via NMOS T50, such that node CBH (which was set high during standby by signal PC) will be pulled to ground so as to provide a high signal to the PDL. Note that when CKBREDN falls (and CKBRED rises) at the end of the write-back cycle, NMOS T51 rises and PMOS T52 falls, to disable the inverter output. Thus, the new check bits are written to the corresponding PDL. Similarly, write-back inverter 64 couples the "complement" signal on ECC bus 21A (i.e., the input to the ECCC line of the T/C receiver 20) to the corresponding PDL.

An interlock is used to make sure that the DRAM arrays receive accurate data. In this case, the same dummy data line DDL is driven high, indicating to signal that the PDLs as driven by the write-back drivers 62, 64 have valid logic states. A dummy write-back driver 66 is coupled to the DDL, and is configured the same as the write-back driver of FIG. 12 except its CB input is permanently tied to GND. When the CBRED, CBREDN signals are generated, the dummy write-back driver 66 will drive the dummy data line up to Vdd with the same general timing as the other write-back generators. The DDL output is sent to clock drivers (not shown) that will provide enable signals to the sense amplifiers of the bit lines within the DRAM. Thus, similarly to the PDL-ECC T/C receiver data transfer, the transfer of data from the ECC circuits to the PDLs is interlocked by a dummy PDL, insuring that the data will not be read before it is valid.

The system is reset after write-back as follows. The rise of the DDL also enables the clock generator (not shown) that produces ARN to switch state. When this happens, the PC generator 25 is restored low, to bring signal PC low to turn off the syndrome generators 30S1–30S9. The fall of ARN also restores the CBR generator 60, disabling the write-back inverters 62 and 64 as well as the dummy write-back inverter 66. The fall of ARN also resets the write generator WGEN 29, to disable the SRAM buffers 29A–29D. Thus, all the circuitry is reset at the end of the cycle, facilitating enhanced performance.

Thus, critical timings within the ECC system of the invention are carefully controlled by the use of a combination of data interlocks and self-timed circuit techniques, so as to minimize propagation delays through the ECC system without compromising ECC performance. As such, the invention facilitates the use of on-chip ECC for DRAMs, increasing both the yield of the DRAMs within the factory and improving the performance of the chips once they are shipped to the field.

Figure 13:
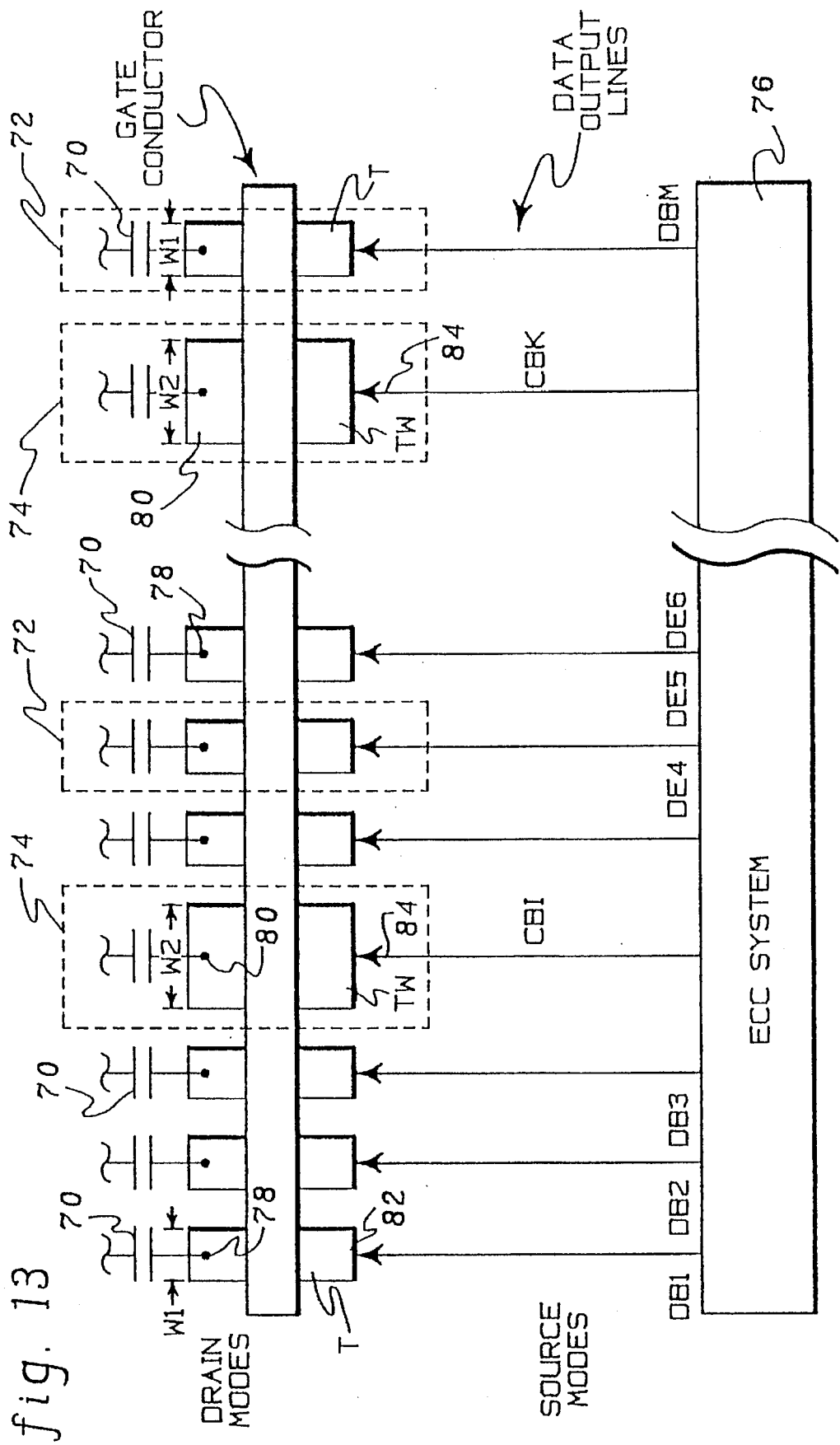
FIG. 13 is a schematic representation showing a portion of a memory device including an ECC system in a writeback operational mode.

FIG. 13 shows a series of two types of storage cells 72 and 74, each of which are of the conventional "one device" DRAM type (i.e., an FET having its gate coupled to a word line, its source coupled to a bit line and its drain coupled to a storage capacitor, wherein a sense amplifier coupled to the bit line compares the voltage from the capacitor to a reference voltage from a reference cell to determine the stored logic state), as generally described in U.S. Pat. No. 3,387,286 issued June 1968 to Dennard and assigned to IBM. It will be noted, however, that the transistors TW contained in cells 74 are wider than the transistors T contained in cells 72. The cells 74 having wider transistors are check bit cells and the cells 72 having transistors T of normal width are data bit cells. Each transistor T has its drain node 78 connected to a storage capacitor 70. Similarly, each transistor TW has its drain node 80 connected to a storage capacitor 70. Transistors T have their source nodes 82 coupled to data bit lines DB1, DB2 . . . DBM, where M is typically 128, thus indicating 128 data bit lines. Transistors TW of cells 74 have their source nodes 84 coupled with check bit lines CB1 . . . CBK, where K is typically equal to 9, thus indicating 9 check bit lines. All transistors 72 and 74 are turned on in the usual way by applying a voltage to word line or gate conductor 86.

It should be understood that the data cells 72 and check bit cells 74 are contained within a DRAM array typically containing 4,096 word lines and 1,096 bit lines, i.e., a 4-M bit DRAM array. It should be further understood that FIG. 13 illustrates a write operation in which the ECC system 76 is accessing a set of storage cells for one particular data word out of many such words which can be similarly accessed within the same 4-M bit DRAM array. Also, this invention may be used with arrays of any suitable size. Likewise, although it is preferred to use 137 bit data words, including 128 data bits and 9 check bits, it is possible to use data words of different sizes.

During a write operation to a memory device having an on-chip ECC system, data bits and check bits will be driven into their corresponding data bit cells 72 and check bit cells 74. Because the ECC system cannot calculate the check bits until it receives the data bits to be stored, the data bits are normally "valid" or ready to be stored before the check bits. Thus, it has been the practice prior to this invention to wait until the check bits are valid before storing the entire data word.

According to the subject invention, however, the time delay associated with this procedure can be reduced or eliminated by beginning the storage of the data bits as soon as they are valid and without waiting for the calculation of the check bits. Then, as soon as the check bits are valid, they may be stored. Since the transistors TW for the check bit storage cells 74 are wider than the conventional transistors found in data bit cells 72, the storage of the check bits will occur more rapidly. Assuming the width of transistors TW is sufficiently large, the storage of the check bits can be completed by the time the storage of the data bits has been completed. Thus, the writeback time penalty heretofore associated with the delay attributable to the calculation of check bits by an ECC system can be eliminated or at least greatly reduced, depending upon how much chip real estate one is willing to consume through the use of wider transistors for the check bit storage cells.

Figure 14A:
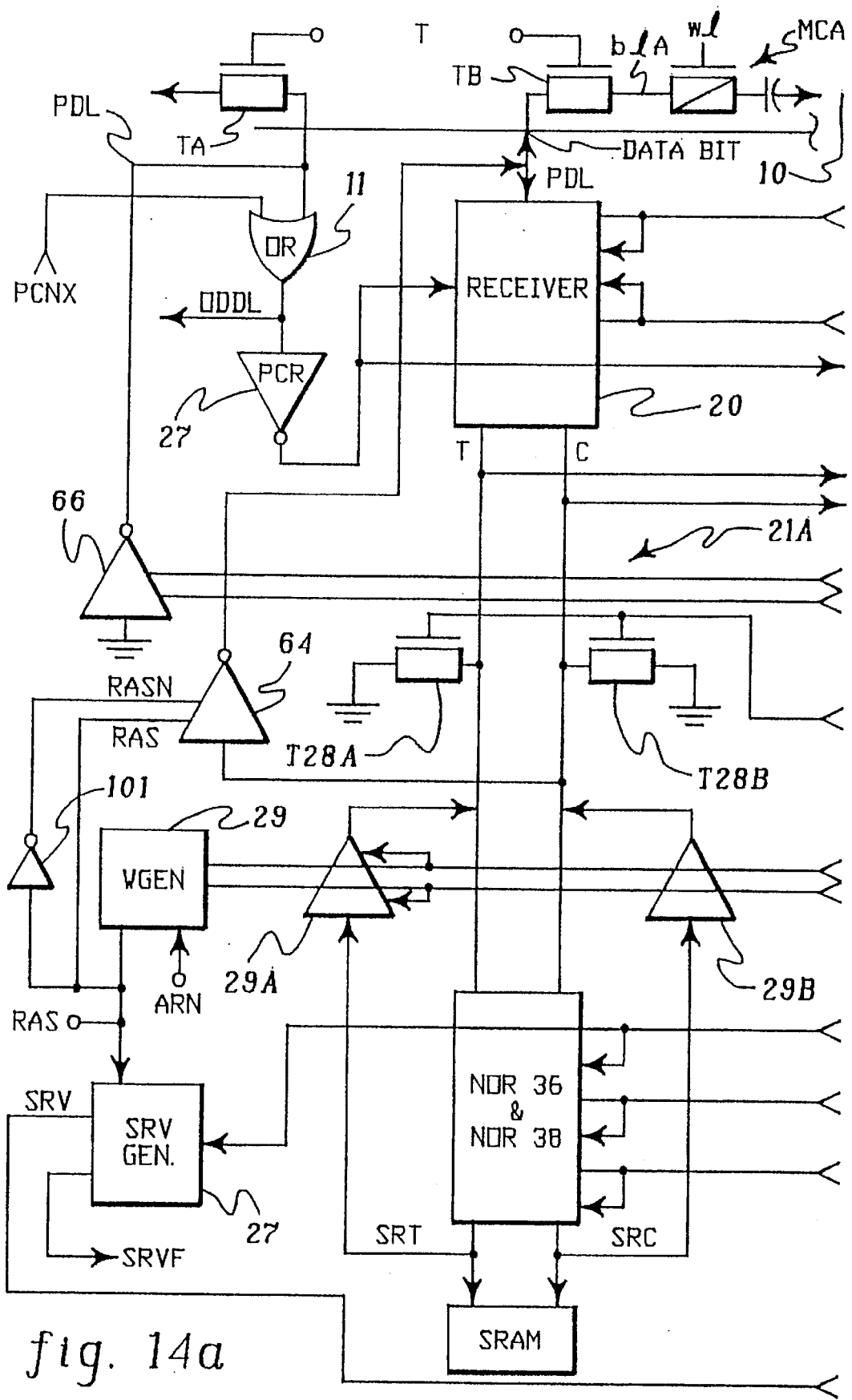
FIGS. 14A & B are a modified detailed block diagram of the ECC system shown in FIG. 2.
Figure 14B:
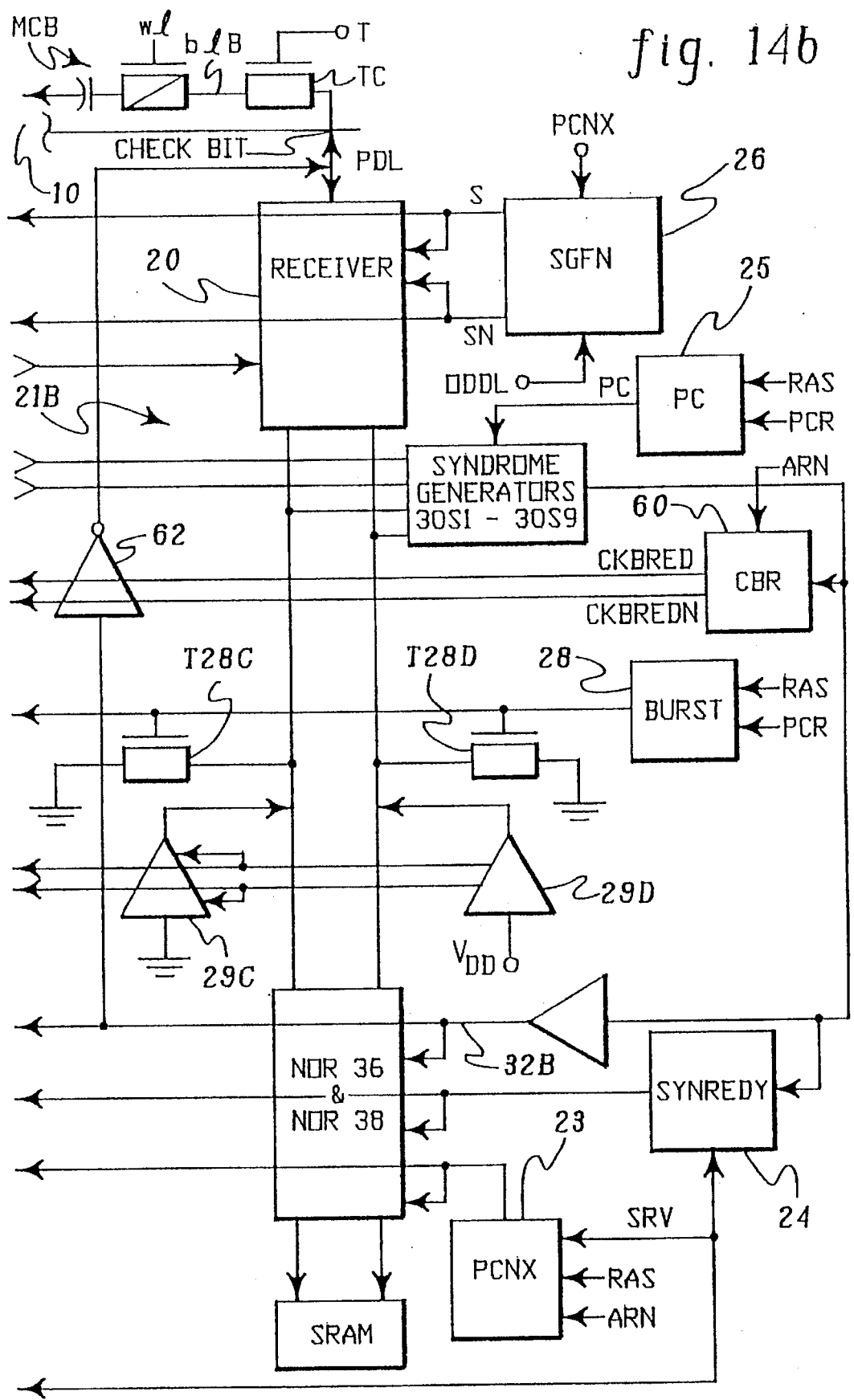

To cause the storage of the data bits to occur as soon as they are valid, it is necessary to make minor modifications to the circuitry illustrated in FIG. 2. FIG. 14 is an illustration of the same circuitry set forth in FIG. 2, but modified to cause the data bits to be stored in the DRAM cells upon the rise in the RAS signal (see FIG. 3). This is accomplished by disconnecting tristate write-back driver 64 from CBR 60, as shown in FIG. 2, and activating driver 64 instead by the rise of chip enable phase RAS and its inverted phase RASN. These changes are illustrated in FIG. 14 where it will be seen that driver 64 is now connected to receive the RAS and RASN signals over the indicated lines, the RASN line including an inverter 101. The modified circuitry illustrated in FIG. 14 will thus cause all data bits to be directed to the DRAM storage cells while the check bits are being calculated by logic circuits labeled 30S1-30S9 (FIG. 1). The check bits will then be sent to the DRAM cells as soon as they are calculated and valid as described with reference to FIG. 2.

The particular placement of the memory cells having widened transistors may be tailored to a particular situation. The invention, of course, allows these cells to be placed anywhere within the array. Generally speaking, it is preferable with on-chip ECC systems to locate particular check bits reasonably close to the sets of data bits to which they relate.

Most importantly, however, it should be noted that the above described invention permits the data bit cells 72 and the check bit cells 74 to be controlled by the same circuitry because the cells of both types are in common array. This aspect of the invention results in substantial savings in cost and avoids the complexity associated with the use of a separate array of check bit cells. Furthermore, because the check bit cells are substantially fewer in number than the data bit cells, the additional chip real estate consumed in implementing the subject invention is minimal. Also, it will be appreciated by those skilled in the art that the subject invention may be applied to any situation in which it is desired to write data words into a memory array where parts of the data words, i.e., groups of bits of some type, are delayed. The groups of bits whose availability for storage is delayed can be addressed to faster memory cells, thus partially or fully compensating for their delay.

Those skilled in the art will further appreciate that the manner in which one makes a cell faster is not limited to widening its transistor. The same result can be accomplished in other ways such as shortening the channel length or any means resulting in higher device transconductance. One could also make the storage capacitor smaller provided the resulting increased noise is acceptable or can be handled satisfactorily. Furthermore, memory cells having different configurations can be modified in any suitable way to increase the speed with which the state of the memory cell may be altered.

While the invention has been particularly shown and described with reference to preferred embodiment thereof, it will be understood by those skilled in the art that the foregoing and other changes in form and details may be made therein without departing from the spirit and scope of the invention. It is intended to encompass all such modifications within the scope of the following claims:

We claim:

1. A memory device for reducing or eliminating computer system delay which would otherwise occur in a WRITE operation when part of the data to be written is delayed comprising:

a first plurality of storage cells having a predetermined access time for receiving undelayed data;

at least one additional plurality of storage cells in common array with the first plurality of storage cells and having an access time faster than said predetermined access time for receiving delayed data, wherein each of the storage cells employs an access device, wherein the access devices employed by the at least one additional plurality of storage cells are faster than the access devices employed by the first plurality of storage cells, wherein each said access device is a transistor and the transistors used in the at least one additional plurality of storage cells have higher transconductances than the transistors contained in the first plurality of storage cells, and wherein each said transistor comprises a source diffusion region and a drain diffusion region, and wherein the source diffusion region and the drain diffusion region of each of the at least one additional plurality of storage cells is of greater width than the corresponding width of each transistor employed in the first plurality of storage cells; and a single control means for: first addressing and storing undelayed data in selected ones of the first plurality of storage cells, and later addressing and storing delayed data in selected ones of the at least one additional plurality of storage cells.

2. A fast writeback memory device having on-chip ECC circuitry for generating check bits associated with data bits in a data word comprising:

an array of memory cells including a plurality of data bit cells having a predetermined access speed for storing data bits and at least one plurality of check bit cells having relatively faster access time for storing check bits, wherein each of the cells employs an access device, wherein the access devices used for the check bit cells are faster than those used for the data bit cells, wherein the access devices are transistors, wherein the transistors used in the check bit cells have higher transconductance than those used in the check bit cells, wherein each said transistor comprises a source diffusion region and a drain diffusion region, and wherein the source diffusion region and the drain diffusion region of each check bit cell transistor has a greater width than the corresponding source diffusion region and drain diffusion region of each data bit cell transistor; and a single control means for first addressing and storing data bits in selected ones of the data bit cells and later addressing and storing check bits in selected ones of the check bit cells.

\* \* \* \* \*